(12) United States Patent
Hedegaard

(10) Patent No.: US 7,387,818 B2
(45) Date of Patent: Jun. 17, 2008

(54) DISPENSING INTERMEDIATE LAYERS

(75) Inventor: Jens Hedegaard, Holstebro (DK)

(73) Assignee: Dansk Mink Papir A/S, Holstebro (DK)

( * ) Notice: Subject to any disclaimer, the term of this patent is extended or adjusted under 35 U.S.C. 154(b) by 460 days.

(21) Appl. No.: 10/529,215

(22) PCT Filed: Oct. 1, 2003

(86) PCT No.: PCT/DK03/00647

§ 371 (c)(1),
(2), (4) Date: Mar. 25, 2005

(87) PCT Pub. No.: WO2004/031058

PCT Pub. Date: Apr. 15, 2004

(65) Prior Publication Data

US 2006/0048479 A1    Mar. 9, 2006

(30) Foreign Application Priority Data

Oct. 2, 2002   (DK) .............................. 2002 01470

(51) Int. Cl.
*B05D 1/40*   (2006.01)
*B05C 1/02*   (2006.01)

(52) U.S. Cl. .................. 427/286; 427/284; 118/39; 118/236

(58) Field of Classification Search ................ 427/286, 427/284; 118/236, 39
See application file for complete search history.

(56) References Cited

U.S. PATENT DOCUMENTS

| | | | | |
|---|---|---|---|---|
| 3,994,764 | A | * 11/1976 | Wolinski | .................... 156/218 |
| 4,137,356 | A | * 1/1979 | Shoemaker et al. | ..... 428/211.1 |
| 4,941,374 | A | * 7/1990 | Focke | ........................ 83/13 |
| 5,752,358 | A | 5/1998 | Chadwick | |

* cited by examiner

*Primary Examiner*—Fred J. Parker
(74) *Attorney, Agent, or Firm*—David S. Safran

(57) ABSTRACT

When stacking stackable items in layers on pallets, intermediate layers of paper/cardboard/film are often used for preventing loss of the items during transport. Even though the intermediate layers ensure to a large extent that items do not fall off the pallet, it cannot be entirely prevented that some of the stacked items fall off because the stacked items slid on the intermediate layers. Special intermediate layers are known, having a surface coated with non-skid coating which highly counteracts the unwanted sliding of the items in the layers stacked on a pallet. However, the laying of intermediate layers with non-skid surfaces constitutes a problem as the individual pieces of non-skid coated intermediate layer will adhere to each other. Thus, there is provided a method and a sheet dispenser where pieces of intermediate layers are successively dispensed, and where these layers are coated with a non-skid coating during dispensing.

14 Claims, 3 Drawing Sheets

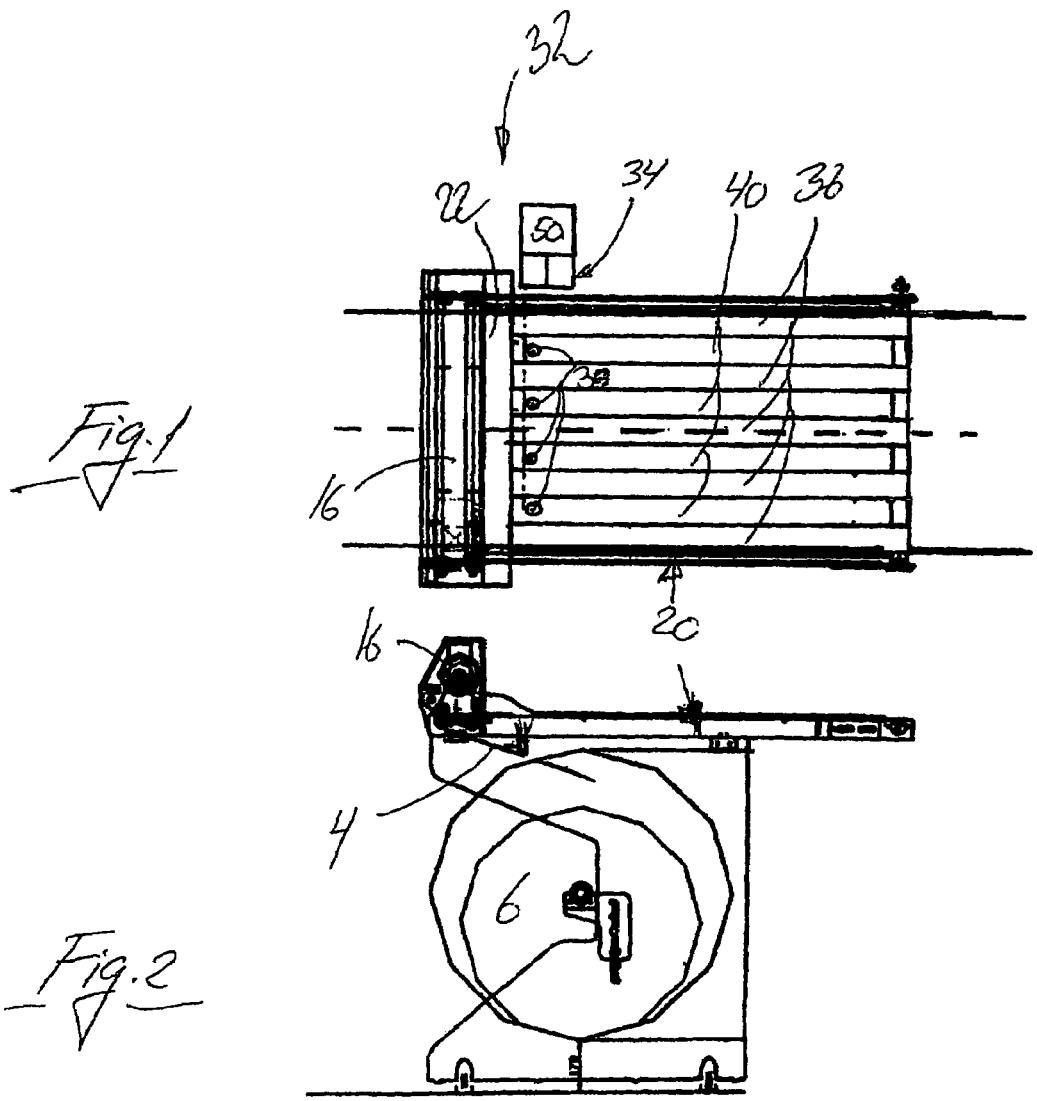

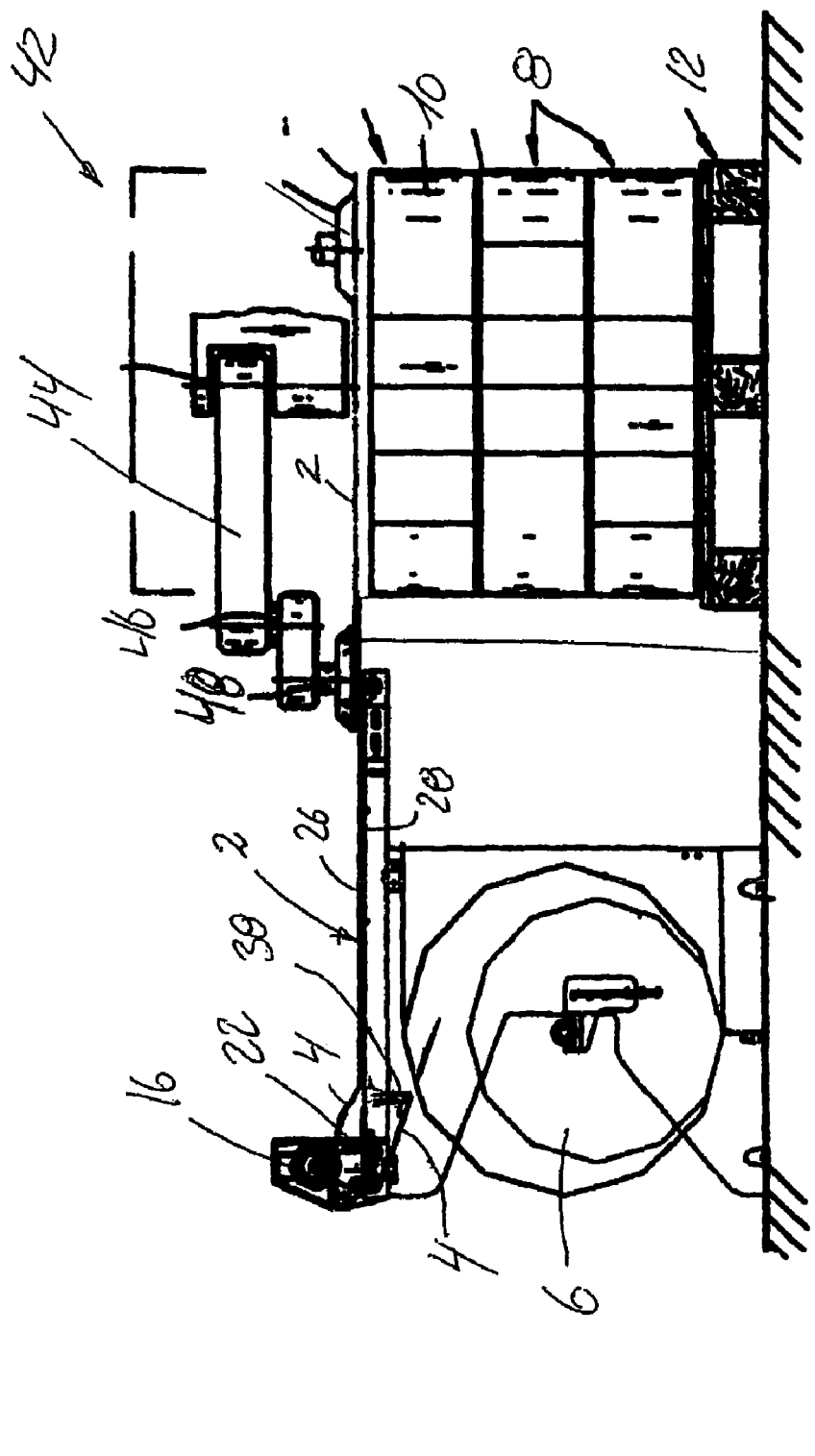

DISPENSING INTERMEDIATE LAYERS

BACKGROUND OF THE INVENTION

The present invention concerns a method for dispensing an intermediate layer of cardboard/paper/film from a web rolled up in a supply, preferably for laying between layers of stackable items on pallets, where the free end of the rolled up supply is moved by feeding means across a table that includes a mechanical cutter unit which is cutting an intermediate layer from the web with a length suitable for an actual pallet size, and from which table the cut intermediate layer is ready for further handling for interposing and laying between the layers of stackable items on a relevant pallet.

The invention also concerns a machine for performing the method.

The invention also concerns use of the machine according to the invention for dispensing intermediate layers in connection with loading pallets or the like with stackable items.

FIELD OF THE INVENTION

A method of the type to which the present invention is directed is disclosed in U.S. Pat. No. 4,941,374 in connection with a method and a machine for loading pallets with stackable items, where the dispensed and cut intermediate layers are laid upon each of the layers of stackable items laid on the pallet by means of a robot arm with a suction cup lift also utilized for stacking the items.

The intermediate layer serves to stabilize the items stacked in layers upon the pallet so that the items do not fall off the pallet during handling of the latter, and furthermore, that the stacks are not mutually displaced. The reason for this is that it will often not be possible to lay out the stackable items in a bond so that the items are interlocking when stacked on the pallet.

The above machine and method has the advantage that the intermediate layers fit actual pallet face size, making the palletizing machine very flexible, since intermediate layers are not to be acquired with different dimensions for different palletizing tasks, as the intermediate layers are pulled out from the supply and adapted in size with a cutter unit, after which the intermediate layers are laid upon the last laid, uppermost layer of stackable items on the pallet.

The above machine furthermore solves a technical problem constituted in that the suction force used in connection with stacking the stackable items on the pallet is probably different from the suction force needed for lifting an intermediate layer from a stack of such and laying it upon the top layer of stacked items. This means that if the suction lift unit is operated with the same vacuum when handling the stackable items as well as when handling the intermediate layers, it will occur with great probability that two or more sheets will often be carried with the suction lift in connection with handling the sheets, at least a part of the way, after which one or more sheets are lost on the floor, which is not suitable, neither for effecting the palletizing procedure nor for the order that should prevail in an areas in which machine operations are to be performed.

The intermediate layers used are typically constituted by cardboard or paper pieces where the tensile force of the said materials is utilized for ensuring that the stackable items are not moving sideways and falling off the pallet.

Even though the intermediate layer, when interposed between the stacked layers of stackable items, to a large extent is safeguarding items against falling off the pallet, it cannot be excluded that from time to time some of the stackable items are lost from a stacked pallet due to the stackable items sliding on the intermediate layers, a situation which is of course not desirable. Special intermediate layers have thus been developed which have their surface coated with a non-skid coating that, to a high degree counteracts, the said undesired sliding of the items in layers stacked on a pallet.

The laying of these intermediate layers with non-skid coating, however, constitutes a problem, as the individual pieces in a stack of intermediate layers with non-skid coating on the surface will tend to adhere to each other, causing it being practically impossible to perform laying of intermediate layers in a technically and economically defensible way with the machine of the kind indicated in the introduction, since by taking an intermediate layer from the stack with the suction lift 2-4 intermediate layers will inevitably be carried with and subsequently laid on the stack of items on the pallet, and of which, maybe, 1 or 2 will fall off during handling. As a solution to this problem may be envisaged using a rolled up web of cardboard/paper/film having one or both sides applied with non-skid coating, but here the layers in the roll will adhere to each other, which will be unsuitable, and therefore it will be necessary to indicate another solution to the problem.

SUMMARY OF THE INVENTION

The present invention is directed to providing a method of the kind indicated above where the dispensed intermediate layer has a non-skid coating applied, ready for further handling, such as laying between layers of stackable items on a relevant pallet, and which can relieve the above drawbacks in handling intermediate layers provided with a non-skid coating or surface.

The advantage of the method of the present invention is that the coating of the intermediate layers with a non-skid coating is accomplished during dispensing of the layers from the rolled up supply of cardboard, paper or film, the free end of which is being passed across a cutter unit where individual intermediate layers are cut off in lengths to fit the load face of the pallet. The intermediate layers cut off the drawn out end of the free end of the rolled up web are thus successively applied non-skid coating simultaneously with being dispensed and laid on the table for further handling. The intermediate layers applied with the non-skid coating are thus not touching each other, as by the specified method, it is supposed that the drawing out of the leading edge of the web across the table, where application of the non-skid coating is effected, is only initiated when the previous intermediate layer has been removed from it. This means that individually cut intermediate layers will not touch each other by the method according to the invention.

The non-skid coating is applied on at least one of the surfaces of the intermediate layer, but application will typically be effected at both sides for ensuring the best possible non-skid function of the intermediate layer. The non-skid coating may also be applied as a number of stripes on the said surfaces, e.g., being a possibility in connection with stacking items that have mutually facing sides with a suitably large area.

The coating of the intermediate layer with a non-skid coating may also be performed over the entire area of the intermediate layer, providing all items stacked on the pallet being secured against sliding.

The application of non-skid coating on the intermediate layer may occur either by extrusion as hot-melt or as spray application, in a way known per se. Of the known preferred methods for application, those that may be mentioned are by atomization by a nozzle, swirl application, or slot coating; however, without excluding the right to use other known methods of application.

The non-skid coating may advantageously be constituted by a "hot-melt" medium, thus achieving a very rapid stabilization of the non-skid coating, enabling the dispensed sheet to be used as intermediate layer immediately after dispensing.

A sheet dispenser for performing the method according to the invention includes a web of cardboard/paper/film rolled up in a supply, feeding means for drawing out the free end of the rolled up supply, a table having a surface preferably constituted by feeding means for the free end drawn out of the rolled up supply and a mechanical cutter unit that may cut off the intermediate layer with a length suited for the pallet concerned, and is peculiar in that the sheet dispenser includes a unit for successive application of a non-skid coating on the underside and/or the upper side of the part of the free end of the length drawn out over the cutter unit and passed over the cutting edge on the mechanical cutter unit.

The feeding means for drawing out the free end of the rolled up supply may advantageously be constituted by interacting pressure rollers.

With the purpose of enabling application of the non-skid coating on the intermediate layers as stripes, the feeding means for the drawn out free end of the length are constituted by a number of interspaced, synchronously driven conveyor belts, and that the unit for successive application of the non-skid coating on the underside and/or the upper side of the part over the cutter unit of the free end of the length drawn out from the rolled up supply includes a number of interspaced application nozzles disposed in one or more of the interspaces between the conveyor belts.

The sheet dispenser for performing the method according to the invention may advantageously be used for dispensing intermediate layers in connection with loading pallets or the like with stackable items with a palletizing machine, including an elevating and lowering as well as pivotable handling arm which is equipped with at least one articulated joint, and the free end of which is provided with a holding element in the shape of a vacuum holder for gripping single items, and a control unit for controlling the handling arm, the vacuum holder and the sheet dispenser, and by which vacuum holder intermediate layers of e.g., paper/cardboard/film are laid between the single layers of stackable items so that after laying of each layer of stackable items between respective item layers there is laid an intermediate layer from the sheet dispenser by using the vacuum holder on the handling arm. Hereby is attained a solution to the problem concerning handling intermediate layers in connection with loading pallets with stackable items, so that only one intermediate layer is laid by means of the suction lift.

By the invention there is thus specified a method for dispensing non-skid intermediate layers in such a way that subsequent operation may be performed in an easy and unencumbered way after dispensing and for disposing the intermediate layers upon layers of stacked items on a pallets, e.g., with a palletizing machine of prior art type.

The invention is explained more closely subsequently with reference to the accompanying drawings.

BRIEF DESCRIPTION OF THE DRAWINGS

FIG. 1 is a top view of a sheet dispenser for intermediate layers, according to the invention, FIG. 2 is a side view of the machine shown in FIG. 1, FIG. 4 is a side view of the palletizing unit shown in FIG. 3.

DETAILED DESCRIPTION OF THE INVENTION

Figure 3:
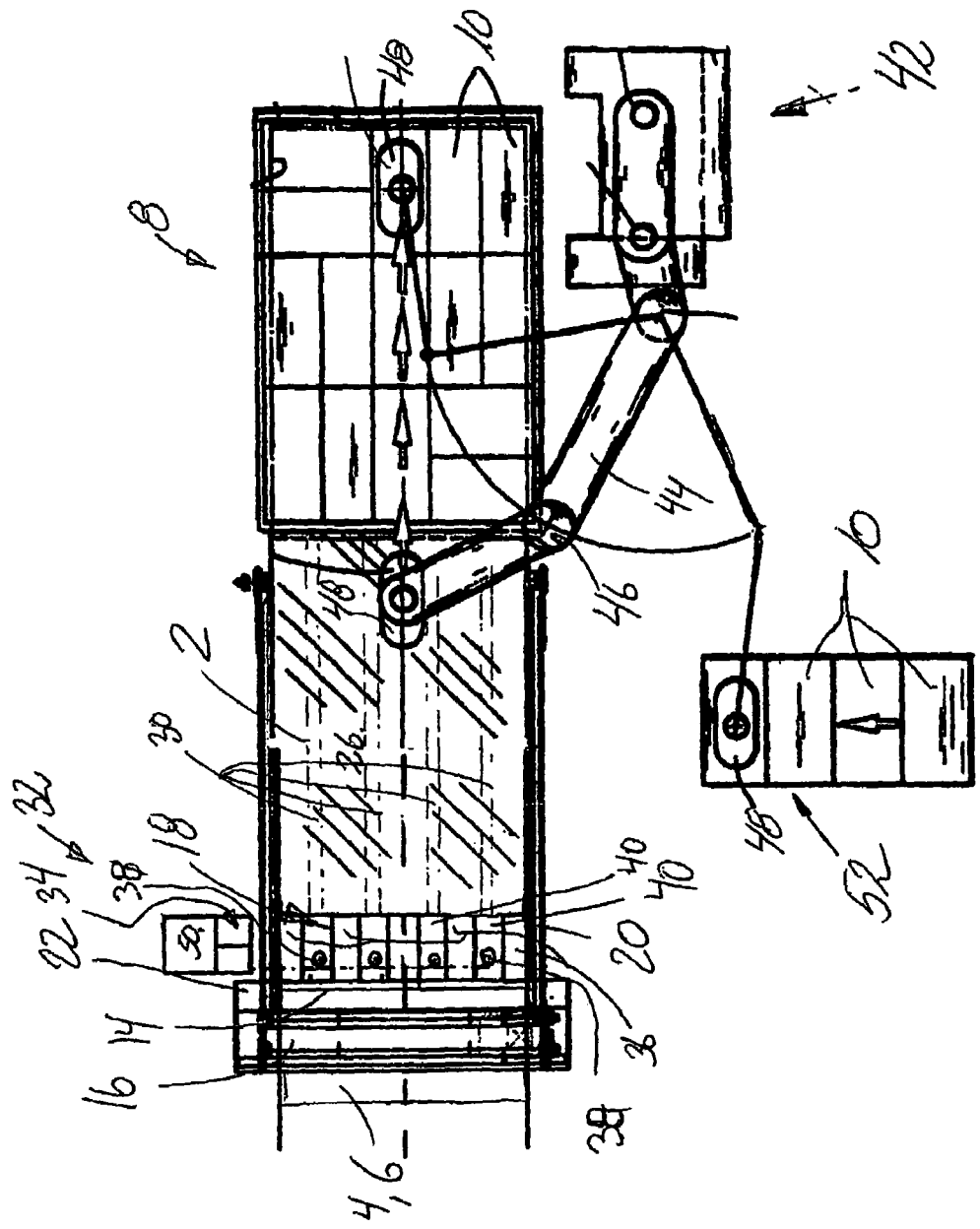
FIG. 3 is a top view of a palletizing unit with a sheet dispenser according to the invention.

FIG. 1 is a top view of an embodiment of a sheet dispenser 32 according to the present invention for dispensing intermediate layers 2 from a web 4 of paper/cardboard/film from a rolled up supply 6, see also FIG. 2.

The sheet dispenser 34 includes feeding means 16 for drawing out the free end 14 from the rolled up supply 6. The feeding means are typically constituted by mutually interacting rollers between which the free end 14 of the web 4 may be placed.

The sheet dispenser 34 also includes a table and a mechanical cutter unit 22 that is located close to the feeding means 16 for drawing out the free end 14 of the web 4 from the supply 6. The knife of the cutter unit 22 is oriented transversely of the longitudinal direction of the table for cutting off the part of the web 4 having its end drawn forth a suitable length on the table 20 by means of the feeding means 18. In the embodiment shown, the feeding means 18 are constituted by interspaced, synchronously driven conveyor belts 36, and where, in the interspaces 40, close to the mechanical cutter unit 22, there are disposed application nozzles 38 for applying a non-skid coating 28 on the underside 24 of the intermediate layer 2 during advancing of the free end 14 of the web 4 over the mechanical cutter unit 22. The conveyor belts 36 will ensure that the intermediate layer 2 will be stretched out on the table 20 before as well as after it has been cut off the web 4 by the mechanical cutter unit 22.

The sheet dispenser also includes diverse necessary sensors for detecting how far the free end 14 of the web 4 has been moved along the table 20, which is of significance for achieving the right size of the intermediate layer 2 and for activating the unit 34 for successive application of non-skid coating 28 on the upper and/or lower side 24, 26 of the free end 14, before it is cut off by the mechanical cutter unit 22, whereby a piece of intermediate layer 2 is formed. Furthermore, sensors are provided for detecting whether an intermediate layer is present on the table 20, as this is of importance for activating the feeding means for drawing out the web 4 from the rolled up supply 6 for conveying onto the table 20 by the interspaced, synchronously driven conveyor belts 36 that constitute the feeding means 18 for the drawn out part 14 of the web 4. The said sensors (not shown) are connected to a control unit 50, in a known way, for controlling the operations of the sheet dispenser as described below.

The sheet dispenser 32 functions in the way that, after detecting by a relevant sensor on the table 20 that an intermediate layer is not present on the table, a drawing out of the free end 14 of the web 4 by the feeding means 16 is performed, whereby the free end 14 is passed across the transverse mechanical cutter unit 22 and out upon the spaced conveyor belts 36 that are activated simultaneously with the rollers 16. In the embodiment of the sheet dispenser 32 according to the invention shown, during advancing of the free end 14 of the web 4, a number of stripes 30 of non-skid coating 28 are applied at the underside 24 of the web 4 by the unit 34 via application nozzles 38 disposed in the interspaces 40 between the conveyor belts 36. This successive application of the non-skid coating is continued until the control system receives signal from a relevant sensor that the free end 14 of web 4 has been moved to a preferred point on the table 20 corresponding to a preferred length, counted from the distance between leading edge 15 of the free end 14 of the web 4 and the mechanical cutter unit 22, of one piece of intermediate layer 2, which is formed immediately after by activation of the mechanical cutter 22 cutting the web 4, so that the intermediate layer, now applied with stripes 30 of non-skid coating 28, lies ready for further conveying/laying upon a layer 8 of items 10 stacked on a pallet 12. By activating the mechanical cutter unit 22, the synchronous running of the conveyor belts 36 is stopped.

Removal of the intermediate layer 2 from the table 30 is detected by a sensor (not shown), and the above procedure is repeated.

FIGS. 3 and 4 are a top view and a side view, respectively, of a palletizing unit including a palletizing machine 42 for laying stackable items 10 in layers 8 on a pallet 12. The palletizing machine 42 includes a handling arm 44 with at least one articulated joint 46, and provided with a holding member 48, which in the shown embodiment is constituted by a vacuum lifter, for handling stackable items 10 that are supplied e.g., from a production line 52 to a pallet 12 upon which the items 10 are disposed in layers 8. As it appears from the drawing, the palletizing unit also includes a sheet dispenser 32 from which intermediate layers 2 are dispensed, and which, according to the invention, have a layer of non-skid coating 28 applied to the underside 24 during dispensing, are taken by the vacuum lifter 48 from the table 20 for placing upon each of the already laid layers 8 of stacked items 10 on the pallet 12. The control unit 50 for the sheet dispenser 32 may be connected with the control unit (not shown) of the palletizing machine, but this will not be strictly necessary due to the sheet dispenser 32's reacting to detection of whether a piece of intermediate layer 2 is present on the table 20 or not.

Thus, there is indicated a sheet dispenser 32 enabling formation of intermediate layers 2 of paper/cardboard/film for laying upon layers 8 of stacked items 10 on a pallet 12 as well as a complete palletizing unit including the sheet dispenser according to the invention.

It is to be mentioned that the inventor has realized that the sheet dispenser and the method according to the invention include other embodiments than those described above and displayed in the drawings. For example, the sheet dispenser may include nozzles for applying a layer of non-skid coating 28 on the upper side 26 of the intermediate layer 2. Also, the feeding means for advancing the drawn out part 14 of the web 4 can be constituted by other means than spaced, synchronously driven conveyor belts.

I claim:

1. Method for dispensing an intermediate layer from a rolled up supply of sheet material for laying between layers of stackable items on pallets, comprising the steps of:
   feeding a free end of the rolled up supply of sheet material by feeding means across a table that includes a mechanical cutter unit,
   cutting an intermediate layer from the supply of sheet material of a length suitable for an actual pallet size, and from which table the cut intermediate layer is ready for further handling, interposing and laying between layers of stackable items on a pallet,
   and applying a non-skid coating on at least one surface of the intermediate layer during said feeding step.

2. Method according to claim 1, wherein the non-skid coating is applied as a number of stripes or lengths on said at least one surface.

3. Method according to claim 2, wherein the number of stripes or lengths of non-skid coating applied to the said at least one surface is in the range of 2-10 stripes or lengths.

4. Method according to claim 2, wherein the number of stripes or lengths of non-skid coating applied to the said at least one surface is in the range of 2-5 stripes or lengths.

5. Method according to claim 2, wherein the number of stripes or lengths of non-skid coating applied to the said at least one surface is in the range of 2-4 stripes or lengths.

6. Method according to claim 3, wherein the stripes or lengths of non-skid coating are evenly distributed over the intermediate layer.

7. Method according to claim 1, wherein the non-skid coating is applied to the surface in atomized form by one of a nozzle, swirl-application, and slot coating.

8. Method according to claim 1, wherein the non-skid coating is constituted by a hotmelt medium.

9. Method according to claim 1, further comprising the additional step of using a vacuum holder on a free end of an elevatable, lowerable and pivotable handling arm of a palletizer which is equipped with at least one articulated joint for laying a respective intermediate layer of sheet material between layers of stackable items so that, after each layer of stackable items is laid, an intermediate layer is placed thereon.

10. Method according to claim 2, wherein the stripes are formed extending in a lengthwise direction of the sheet layer.

11. Method according to claim 10, wherein the stripes are formed by being sprayed onto the sheet material as it fed onto the table.

12. Sheet dispenser for dispensing an intermediate layer from a rolled up supply of sheet material for laying between layers of stackable items on pallets, comprising:
   a web of sheet material rolled up in a supply,
   feeding means for drawing out a free end of the rolled up sheet material from the supply,
   a table having a surface for receiving the free end drawn out of the rolled up supply and a mechanical cutter unit for cutting off the intermediate layer with a length suited for a pallet, and
   dispenser unit for successive application of a non-skid coating on at least one side of a length of the sheet material that has been drawn out over the cutter unit and passed over the cutting edge on the mechanical cutter unit.

13. Sheet dispenser according to claim 12, wherein the feeding means for drawing out the free end of the length comprises a number of interspaced, synchronously driven conveyor belts, and the dispenser unit for successive application of the non-skid coating includes a number of interspaced application nozzles disposed in at least one interspace between the conveyor belts.

14. Sheet dispenser according to claim 12, further comprising a palletizer including an elevatable, lowerable and pivotable handling arm which is equipped with at least one articulated joint, a free end of the handling arm being provided with a vacuum holder for gripping single items, and a control unit for controlling the handling arm, the vacuum holder being operable for laying a respective intermediate layer of sheet material between layers of stackable items so that, after each layer of stackable items is laid, a intermediate layer is placeable thereon by the vacuum holder on the handling arm.

* * * * *